United States Patent [19]

Krüger

[11] Patent Number: 4,646,147

[45] Date of Patent: Feb. 24, 1987

[54] METHOD AND APPARATUS FOR SCRAMBLING AND UNSCRAMBLING TELEVISION SIGNALS

[75] Inventor: H. Eckhard Krüger, Sorsum, Fed. Rep. of Germany

[73] Assignee: Blaupunkt-Werke GmbH, Hildesheim, Fed. Rep. of Germany

[21] Appl. No.: 673,740

[22] Filed: Nov. 21, 1984

[30] Foreign Application Priority Data

Nov. 30, 1983 [DE] Fed. Rep. of Germany ....... 3343307

[51] Int. Cl.$^4$ ................. H04N 7/167; H04N 7/16; H04K 1/00
[52] U.S. Cl. ............................ 380/14; 380/19; 380/20
[58] Field of Search ............ 358/123, 122, 121, 114, 358/119; 179/1.55

[56] References Cited

U.S. PATENT DOCUMENTS

| | | | |
|---|---|---|---|
| 4,221,931 | 9/1980 | Seiler | 179/1.5 S |
| 4,266,243 | 5/1981 | Shutterly | 358/121 |
| 4,295,223 | 10/1981 | Shutterly | 358/121 |
| 4,405,942 | 9/1983 | Block et al. | 358/119 |
| 4,551,580 | 11/1985 | Cox et al. | 179/1.5 S |

*Primary Examiner*—Stephen C. Buczinski
*Assistant Examiner*—Melissa L. Koltak
*Attorney, Agent, or Firm*—Frishauf, Holtz, Goodman & Woodward

[57] ABSTRACT

Even though television signals are transmitted as analog signals over cable from the transmitter to the receivers of customers of the cable system, programs for which charges to the customers are payable are scrambled at the transmitter and unscrambled at the receiver on a digital basis, requiring digital-to-analog and analog-to-digital conversion both at the transmitter and at the receiver. In some cases there is such conversion at the receivers already for normal reception processing. By the provision of digital scrambling and unscrambling, it is possible to use a digital key which is subject to variation by a random signal generator, this key being transmitted during a one-line period that forms part of the vertical blanking interval. The unscrambling circuit has a built-in microprocessor so that its mode of operation corresponding to that of the control circuit at the transmitter is not readily detectable.

21 Claims, 13 Drawing Figures

| A | B | Y |
|---|---|---|
| 0 | 0 | 0 |
| 0 | 1 | 1 |
| 1 | 0 | 1 |
| 1 | 1 | 0 |

| A | B | Y |
|---|---|---|
| 0 | 0 | 0 |
| 0 | 1 | 1 |
| 1 | 0 | 1 |
| 1 | 1 | 0 |

| Bit | 3 | 2 | 1 | 0 | |
|---|---|---|---|---|---|
| | | 0 | 0 | 0 | → V1 |
| | | 0 | 0 | 1 | |
| | | 0 | 1 | 0 | |
| | | 0 | 1 | 1 | |
| | | 1 | 0 | 0 | → V5 |
| | | 1 | 0 | 1 | |
| | | 1 | 1 | 0 | → V8 |

| A | B | Y |
|---|---|---|
| 0 | 0 | 0 |
| 0 | 1 | 1 |
| 1 | 0 | 1 |
| 1 | 1 | 0 |

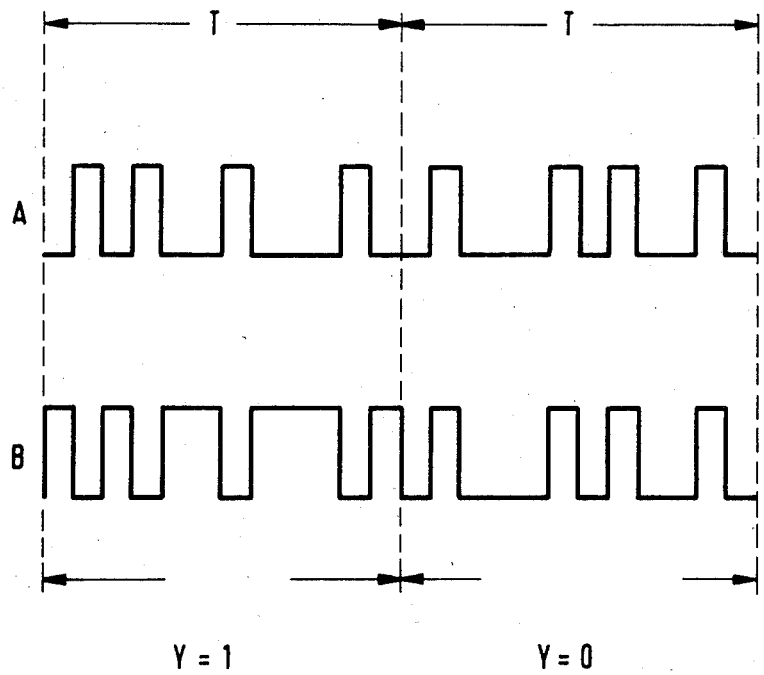

METHOD AND APPARATUS FOR SCRAMBLING AND UNSCRAMBLING TELEVISION SIGNALS

The invention concerns scrambling and unscrambling signals that are usually transmitted in analog form, particularly composite television signals, such as those according to the NTSC or FBAS standards and the accompanying sound signal. Methods and circuits for this purpose have acquired increasing importance in recent times, especially for cable television systems.

Another field for such methods and circuits are systems for broadcasting programs during the late-night and early morning hours which are directed to recorders at the receivers of sleeping viewers who are willing to pay fees for thus obtaining broadcasts to be replayed at another time from their recorder. A similar possibility for scrambled pay-TV lies in the field of transmissions relayed by satellites.

It is common for cable television systems to provide the possibility of receiving programs available to the local public by direct broadcast for a normal monthly fee and to provide in addition other programs carrying extra fees. In places where direct reception is very good, transmissions subject to special fees are sometimes made available by a community antenna and distribution system for reception of programs that cannot be received locally with normal receiving antennas. Such programs may be distributed, for example, over broadband cables to customers of a cable television system.

In practice it appears that within a region served by television cables, not every owner of a television receiver connected to the cable system desires to observe the supplementary programs offerred subject to fee. They may limit themselves merely to use of the cable for obtaining better reception of programs available in the area by direct broadcast. Care must be taken to prevent such customers of the cable system from access to programs for which they have not paid which are being transmitted by the same broadband cable as the programs which are made available without extra fees to these viewers. Without appropriate measures to take care of this situation, the persons declining the opportunity to view the supplementary programs on a fee basis could become "covert free-loaders".

It has accordingly already become known to transmit the programs for which special fees are charged in scrambled form, with the consequence that these programs can be received by a normal television receiver, but only as undecipherable picture and sound reproduction, on account of the scrambling. Only with a supplementary unscrambling device, sometimes called a "descrambler", made available on a fee for use basis, is it then possible to enjoy the supplementary programs without trouble.

In order to avoid misuse of the system ultimately taking place, the scrambling should have a certain degree of "reverse engineering" difficulty, so that it is not readily possible for unpracticed cheaters to obtain clarified reception without an authorized unscrambling device.

It has already been proposed to scramble analog television signals by separating the synchronizing pulses from the television signals and transmitting them in a separate channel. At the receiver location, the separated synchronizing signals are supplied only to those who have subscribed to the supplementary programs, so that the non-participant would receive the television signal without the synchronizing pulses, without which no picture reproduction is possible. This resolution of the problem has the disadvantage that unscrambling is possible by relatively simple means. No great difficulty is involved for setting up and adjusting an oscillator for generating synchronizing pulses and thereby to receive the program in question clearly.

It is also conceivable to delay particular selected lines of the television picture in a certain rhythm before the television signal is broadcast. This time delay must then be compensated out at the receiving location and for this purpose, it is necessary to know at the receiver location the "key" or "prescription" according to which the line delay pattern is produced at the transmitter. The key information is then transmitted separate from the television signal itself, which means that here also a separate channel is necessary, as in the case of the separately transmitted synchronizing signals.

Even though according to the scheme just described, unscrambling without possession of the key is relatively difficult, there is still the disadvantage that considerable expense is necessary in operation, on account of the supplementary transmission channel that is necessary to provide the key signal to the receiver for unscrambling.

The above-described scrambling systems cannot fulfill, on the whole, the strict requirements that would normally be regarded as appropriate for guarding against possible misuse. Either unscrambling is relatively simple so that even unpracticed people can do it without paying for the regular key, or the expense makes the system economically impractical by requiring that a supplementary transmission channel should be made available from a central place to the various authorized receivers.

SUMMARY OF THE INVENTION

It is an object of the present invention to overcome the above-described disadvantages and to provide a method and system for scrambling and unscrambling analog signals, especially the sound and composite video signals of television transmission which provide extremely high security, so that unscrambling is not practicable by persons not given access to the key, while at the same time the system can be simply constituted without requiring a supplementary independent transmission channel.

Briefly, from the method aspect, it is a feature of the invention that both the scrambling and the unscrambling takes place on a digital basis with digital signals. The methods and systems previously used for scrambling and unscrambling television signals have operated exclusively on analog signals both for scrambling and unscrambling. In contrast thereto, the invention indicates a new way of dealing with the problem by working with digital signals and carrying out the scrambling and unscrambling on a digital basis, even though the transmission from a central point to the place of use may have to take place in analog signal form.

The key according to which the scrambling of a television signal takes place at the transmitter location can be readily transmitted in a television line interval lying outside the usual active line group of a picture field, so that a supplementary transmission channel outside the television transmission channel itself is not necessary. Furthermore, digital signals can be very simply and safely scrambled and also unscrambled by controllable logic circuits.

A further advantage of this feature of the invention is the fact that the provision of digital signal processing has already caught on in recently developed modern television receivers. In the case of such receivers, the received analog television signal is already converted into a digital signal, processed in that form and then reconverted into an analog signal for control of the picture tube. Digital circuits already present in such television receivers can be advantageously made use of in the method of the present invention, with the result that only a small supplementary circuit expense and complication is necessary for equipping the receivers for the practice of the present invention.

Since according to the invention the scrambling and unscrambling is produced on a digital basis with digital signals, the analog signal to be scrambled is first converted into a digital signal by means of an analog-to-digital converter. It has been found that for this purpose at least twelve quantizing steps are desirable for the sound signal and at least seven quantizing steps for the composite video signal. In consequence, it is convenient to operate with twelve bit words for sound signals and seven bit words for video signals.

The digital sound signal and the digital composite video signal are scrambled, and likewise unscrambled in separate scrambling and unscrambling circuits respectively for sound and composite video signals, but it is convenient in accordance with a further development of the invention for both scrambling circuits to be under the control of a common control circuit. The control circuit is also connected to a random signal generator for altering the scrambling prescription or key in a random pattern. Consequently, it is technically impossible for a third party to carry out unscrambling to obtain access for themselves to the programs in question without purchasing or renting a special unit making the key available.

After the sound and composite video signals have been scrambled, they are converted into scrambled analog signals by digital-to-analog conversion. These analog signals are supplied from the transmission location into a cable by which they are received by customers, those authorized to receive the programs for which there is an additional fee being provided with an unscrambler. Only these customer viewers can receive the scrambled television signals with clarity, while the remainder of the customer viewers cannot receive usable pictures or even usable sound by tuning the channel containing the scrambled television signal.

The unscrambling, as already mentioned, also takes place on a digital basis. The received sound and composite video signal are converted into corresponding digital signals before unscrambling takes place on a digital basis. The key that is significant for this purpose is obtained from a special line analysis circuit which picks up the television line intervals in which the key is transmitted and detects the key signal.

After unscrambling, digital signals are made available which can be converted into corresponding analog signals to provide the desired television signals by which the sound and picture can be reproduced clearly and faithfully by the television receiver.

In a particularly useful embodiment of the invention, a microprocessor is used for unscrambling which is controlled by the above-mentioned line analysis circuit and delivers the key for the unscrambling both of the sound signal and of the composite video signal. By the use of a microprocessor, it is even possible to obtain the fee information and to calculate the charges to the cable television customer for his use of the pay-TV program.

A particular embodiment of scrambling and unscrambling logic for use in the method and circuits of the invention is described in the description that follows.

BRIEF DESCRIPTION OF THE DRAWINGS

The invention is further described by way of illustrative example, with reference to the annexed drawings, in which:

FIGS. 12 and 13 are pulse diagrams illustrating the effect of the scrambling circuit on processed signals;

DESCRIPTION OF THE ILLUSTRATED METHOD AND EMBODIMENTS

Figure 1:
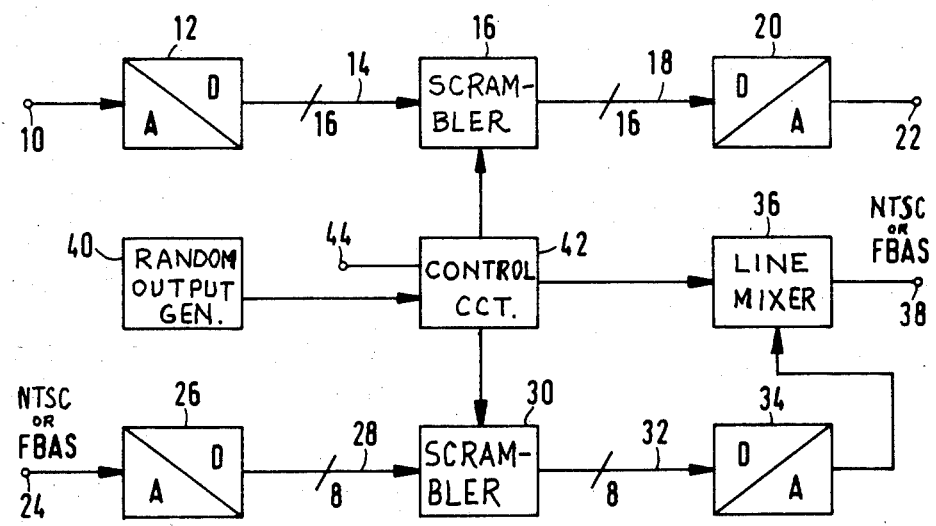
FIG. 1 is a circuit block diagram of apparatus for scrambling the sound and composite video signals of a television transmission.

In the embodiment shown in FIG. 1, television signals comprising a sound and a composite video signal are scrambled at the place of transmission. The respective scrambling circuits can be interposed in the sound and composite video signal paths at any desirable place, but of course always ahead of the transmitting operation.

Two input terminals 10 and 24 respectively make available the analog sound and composite video signals. The former is supplied to an analog-to-digital converter 12 where a 16-bit converter is provided for making sure the sound transmission has studio quality. At the output of the converter 12, the signal in digital form comes out at 16 outputs in parallel and the connection 14 which leads to a scrambling logic circuit 16 accordingly has 16 separate conductors. The desired scrambling in the first scrambler circuit 16 accordingly takes place only after conversion of the analog sound signal into digital signals. The scrambled digital signals are then supplied to a first digital-to-analog converter 20 over a connection 18, which likewise has 16 individual conductors. A scrambled analog sound signal is then made available at the output terminal 22.

The processing and scrambling of the composite video signal at the input terminal 24 takes place in a similar fashion. It has been found that the resolution corresponding to a 7-bit or 8-bit conversion is sufficient for the second analog-to-digital converter 26 to which the signals at the terminal 24 are supplied. The connection 28 in FIG. 1 has 8 conductors (8-bit resolution). After scrambling, the digital signals are supplied over a connection 32 to the second digital-to-analog converter 34 for conversion into a scrambled analog signal. This analog signal is provided to a line mixer 36 which is connected to the output terminal 38 where the scrambled analog composite video signal is made available.

The first scrambling circuit 16 and the second scrambling circuit 30 are controlled in common by a central control circuit 42, which delivers an algorithm (scrambling key) according to which the scrambling in the scrambling circuits 16 and 30 proceeds. The synchronizing pulses of the television signal are supplied from an input terminal 44 to the control circuit 42, the latter being also connected with a random output generator 40. The latter has the effect of changing the key according to a random criterion, so that there is no "fixed rule" for scrambling. In consequence, unscrambling for purposes of unauthorized utilization of the program in question in a cable television system becomes practically impossible.

In order that at the receivers of viewers entitled to view the special programs may have these programs available to them by unscrambling, the key provided by the control circuit 42 must naturally be made available to them. For this reason, the key, in the form of digital signals, is brought into a data line interval transmitted in the vertical blanking interval of the television signal, this operation being performed in the line mixer 36 already mentioned. The composite video signal as it appears at the output signal 38 therefore includes the scrambling key. The scrambled television signal can be supplied to a television transmitter from the output terminals 22 and 38 in order to feed the transmitted television signal into a broadband cable. It should be mentioned further that the mixing in of digital signals in the interval of a data line in the vertical blanking interval is a procedure already known and used, for example, in so-called video text transmission, as well as in connection with the transmission of supplementary programs transmitted in normal sleeping hours for recording at receiving locations. The circuits for the line mixers, such as the line mixer 36 in the present case, for inserting digital signals in such a television line within the vertical blanking interval, are accordingly well-known and do not need to be described further here.

Figure 2:
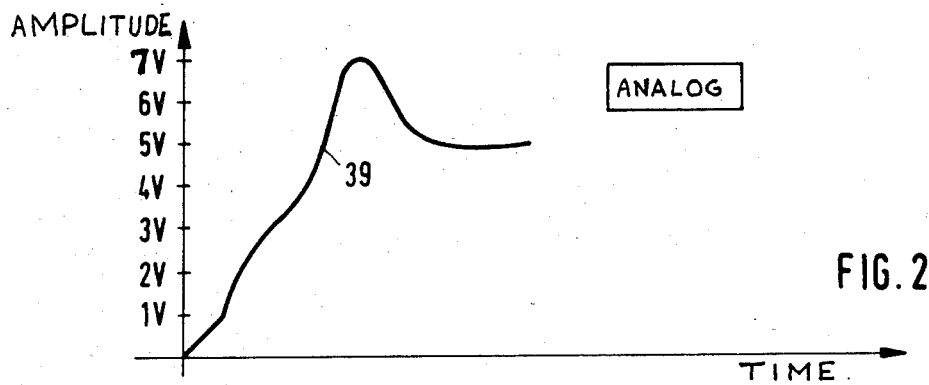
FIGS. 2 and 3 are graphical representations for explaining conversion of an analog signal into a digital signal.
Figure 3:
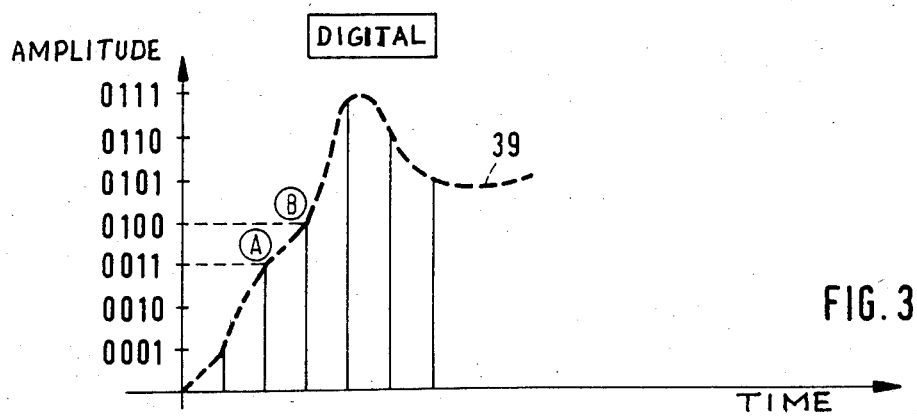

FIGS. 2 and 3 serve to make clear the manner of operation of an analog-to-digital converter. An analog signal 39 illustrated in FIG. 2 is discretely sampled at particular instances and the several values of the signals are each represented in digital form.

In FIG. 3, the value of the signal at A, for example 3 volts (with reference to the 1 volt steps shown in FIG. 2) becomes "0011" in digital representation. Similarly, the value at B (4 V) provides the digital signal "0100".

Figure 4:
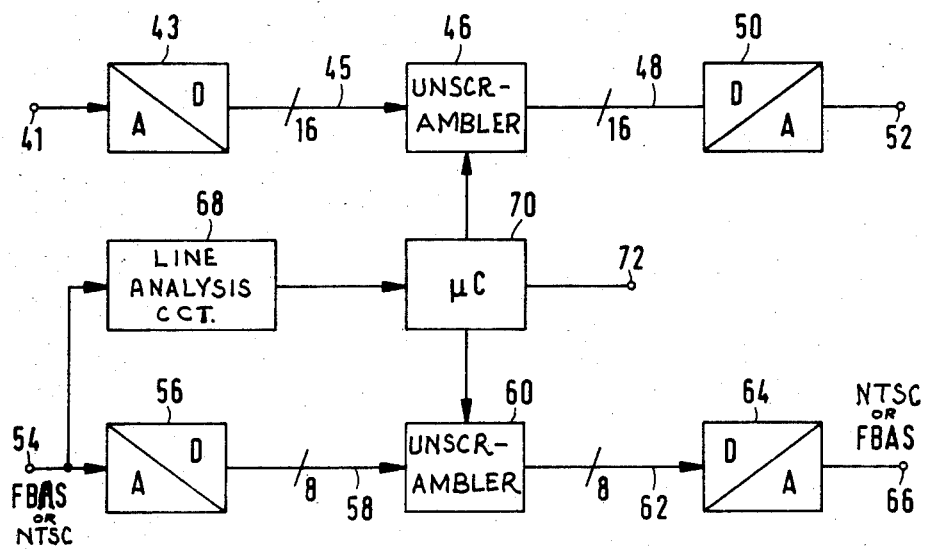
FIG. 4 is a block circuit diagram of apparatus for unscrambling a scrambled television signal in accordance with the invention.

With the circuit shown in FIG. 4, it is possible for the cable television customers to unscramble the scrambled television signal available at the inputs 41 and 54 in order to obtain clear picture and tone reproduction.

The scrambled analog sound signal is first converted into a digital signal by a third analog-to-digital converter 43, the 16-conductor connection 45 making the output to a first unscrambling logic circuit 46. The supply bit pattern is there unscrambled, so that the unscrambled digital signal is supplied over the connection 48 to a third digital-to-analog converter 50, at the output terminal 52 of which the unscrambled analog sound signal is made available.

In a similar way the unscrambling of the composite video signal is performed by a second unscrambling circuit 60 after previous conversion into digital signals in a fourth analog-to-digital converter 56 from which digital signals are supplied over a connection 58 to the unscrambling circuit 60.

After unscrambling performed on a digital basis, the unscrambled digital signals are supplied over a connection 62 to a fourth digital-to-analog converter 64, at the output of which the unscrambled analog composite video signal is made available for further processing.

The unscrambling operation naturally assumes knowledge of the scrambling key which is contained in a data line transmitted during the vertical blanking interval. Accordingly, the composite video signal supplied at the input terminal 54 is supplied to a line analysis circuit 68 which picks out and detects the content of the line in which the scrambling key is contained. This key is then supplied to a microprocessor 70 which delivers the key in a usable form and thereby controls the unscrambling circuits 46 and 60. The microprocessor 70 also provides a report-back signal at its output terminal 72 on the basis of which the fees for receiving the scrambled transmission can be calculated whenever the viewing customer makes use of the pay-TV programs.

Since both the scrambling and the unscrambling take place on a digital basis in the circuits described up to this point, it is clear that the method of the invention can be carried without loss of signal quality. In addition, a high degree of security is obtained, while the digital signals can be scrambled quite simply. Since after scrambling, conversion back into analog signals takes place, the method of the invention is fully compatible with television transmission and reception standards. The circuits involved can be interposed in the signal paths in any of a wide variety of places. The method of the invention, furthermore, avoids any sacrifice of quality which might result from cross-talk between the video and audio channel.

Figure 5:
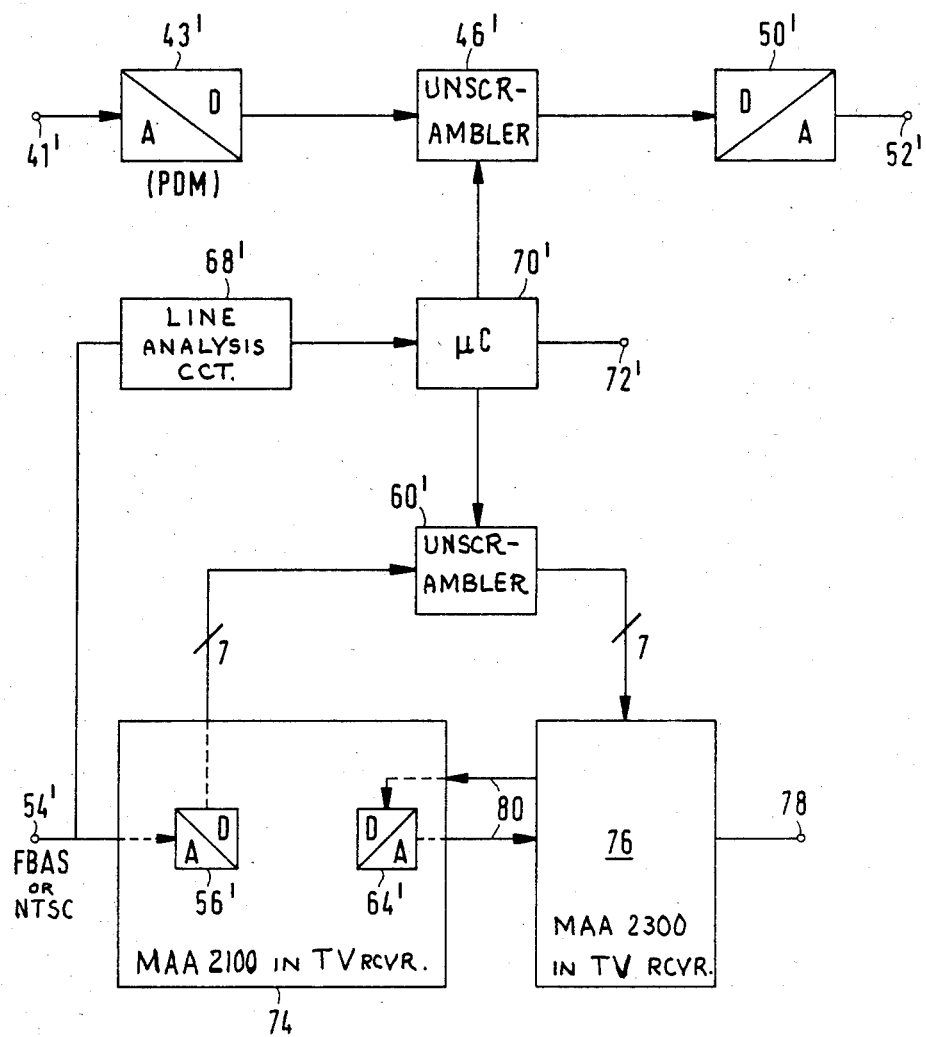
FIG. 5 is another block circuit diagram of a circuit for unscrambling a scrambled television signal in accordance with the invention.

A different advantageous embodiment of the invention affecting the unscrambling at the receiver is shown in FIG. 5. It is here assumed that the television receiver incorporates digital signal processing in the circuits for receiving unscrambled television signals.

This receiver circuit accordingly already incorporates an analog-to-digital converter 56' for the composite video signal and likewise an analog-to-digital converter 43' for the sound signal. In addition, this known type of receiver also incorporates already digital-to-analog converters that can also be utilized for the practice of the present invention, in addition to their use in connection with signals which have never been scrambled.

In the circuit of FIG. 5, integrated circuits 74 and 76 are provided for the known digital signal processing of received television signals which are connected together in reciprocal fashion by the connections 80 illustrated schematically in the figure. At the output terminal 78, an analog output signal for the remaining operations of television reception followed by control of a picture tube is made available. The known receiving circuit of the kind here described also has the two integrated circuits 43' and 50' for the sound signal path (only one sound channel is shown in FIG. 4; the integrated circuit 10, however, may be provided for processing two channels for stereo reproduction).

The following known integrated circuits can be used: MAA2100 for the circuit 74, MAA2200 for the circuit 76, MAA2300 for the circuit 43' and MAA2400 for the circuit 50'. The analog-to-digital conversion of the composite video signal is in this case processed at 7-bit resolution.

A feature of the circuit of FIG. 5 is that a pulse density modulator is involved in the analog-to-digital converter 43' which, like the demodulator constituted by the digital-to-analog converter 50', is controlled by a central microprocessor which is not shown in FIG. 5. For this reason, an unscrambling key for the unscrambling circuit 46' is needed which is different from the key for the unscrambling circuit 60'. In other words, the previously produced pulse density modulation must be taken account of. The corresponding conversion of the unscrambling key is performed in the microprocessor 70'. At the output of the unscrambling circuit 46', therefore, an unscrambled digital signal is made available which would also be obtained if the unscrambled analog sound signal were subjected to pulse density modulation. After processing by the digital-to-analog converter 50', the unscrambled analog sound signal can therefore be obtained at the output terminal 52'.

In the signal path of the composite video signal, the analog composite video signal available at the input terminal 54' is converted into a digital signal by the analog-to-digital converter 56' already included in the integrated circuit 74. The digital signals are supplied to the unscrambling circuit 60' which is controlled by the microprocessor 70'. The unscrambled digital signals from the output of the circuit 60' are then brought to the integrated circuit 76, which, as already mentioned, cooperates with the integrated circuit 74 which already has a digital-to-analog converter 64', used to deliver an analog composite video signal for further processing.

In connection with FIG. 5, attention should further be called to the line analysis circuit 68' which corresponds in its function to the line analysis circuit 68 already described with reference to FIG. 4. The microprocessor 70' likewise has an output terminal 72' at which a report-back signal can be obtained for calculating program fees.

The embodiment of FIG. 5 is particularly advantageous, since already present circuit parts of integrated circuits provided in a receiver unit can be further utilized in order to assist in performing the process of this invention. The places for pulling out the sound and composite video signals are readily accessible, following the analog-to-digital conversion. Unscrambling can therefore be inexpensively constituted in the receiver merely by a supplementary unscrambler.

In contrast to the equipment of receivers, greater circuit complication can be tolerated at the transmitter location even when higher cost is involved. The circuit for scrambling needs to be provided only once, whereas unscrambling must be done by supplementary equipment at the reception and for every viewing customer. Accordingly, the economy obtainable by the invention is outstanding, since the situation at the transmitter is not of equally decisive importance.

In what follows, examples of a few digital unscrambling circuits are described in more detail. The unscrambling circuit 60 shown in FIG. 6 can be used for unscrambling the composite video signal in the system of FIG. 4 on the basis that in this case seven quantizing levels are specified.

At each of the seven input lines (0–6), the individual bits of the 7-bit samples are supplied to the unscrambling circuit 60, the several input conductors being respectively connected to the A inputs of an array of exclusive-OR gates 82, 83 ... 88. The respective second inputs B of the exclusive-OR gates 82,83 ... 88 are subjected to control by digital signals from the microprocessor 70 (compare FIG. 4), and the output lines Y of the exclusive-OR gates 82,83 ... 88 lead to the digital-to-analog converter 64 of FIG. 4.

Figures 6, 7:
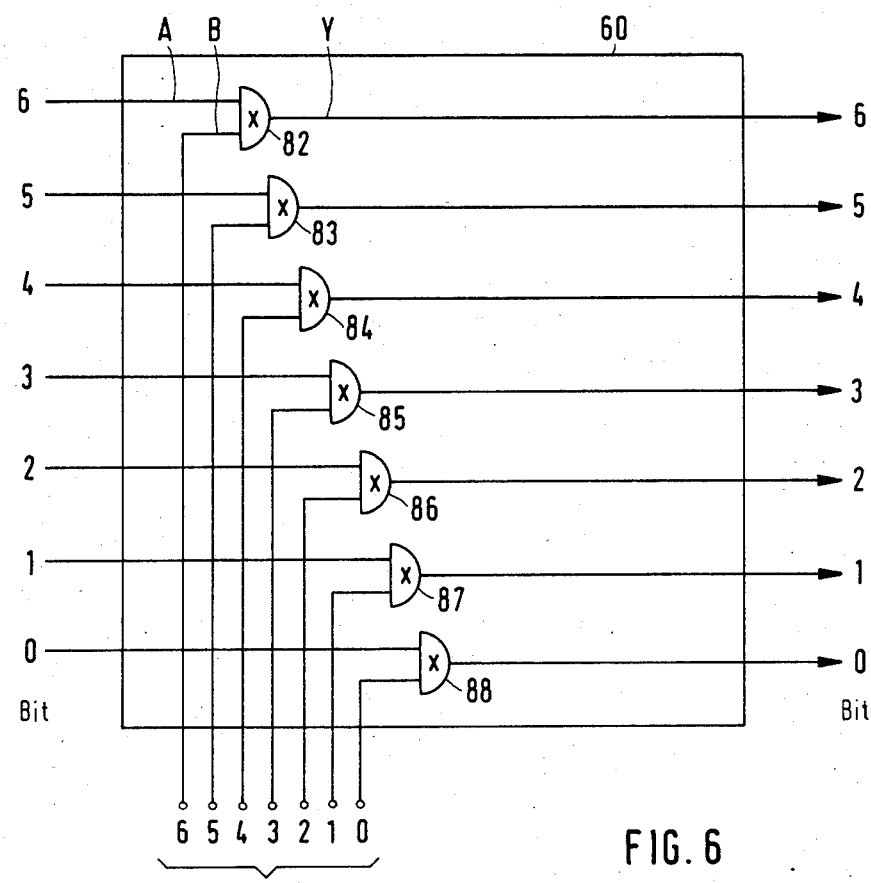
FIG. 6 is a circuit diagram of one of the unscrambling circuits of FIG. 4 or FIG. 5 controlled by a microprocessor.
FIG. 7 is a truth table for explanation of the circuit of FIG. 6.

The truth table of an exclusive-OR gate, given in FIG. 7, shows that digital signals at the output Y are always the same as the digital signal at the input A if the control signal at the input B is a "0". In the case of a "1" at the control input B, the input signal is in every case inverted (0 for 1 and 1 for 0). On the basis of this manner of operation of an exclusive-OR gate, unscrambling of the digital signals can be carried out in FIG. 6 and of course the scrambling occurs in a corresponding way.

If, for example, all seven control lines from the microprocessor 70 supply control bits "0", the signals at the input and output of the unscrambling circuit are identical. In another example, let the application of digital signals to the seven input lines be as follows:

| (A)   | 6 | 5 | 4 | 3 | 2 | 1 | 0 |
|-------|---|---|---|---|---|---|---|
| Input | 1 | 0 | 1 | 1 | 0 | 0 | 1 |

On the basis of the previously described manner of operation, there are then provided at the output lines the following scrambling of the input signals, with the following indicated control bits are used:

| Control Bits | 1 | 0 | 1 | 0 | 0 | 1 | 1 |
|--------------|---|---|---|---|---|---|---|
| Output       | 0 | 0 | 0 | 1 | 0 | 1 | 0 |

An integrated circuit of type 74 LS 86 can be used for the exclusive-OR gates 82,83 ... 88.

Figure 8:
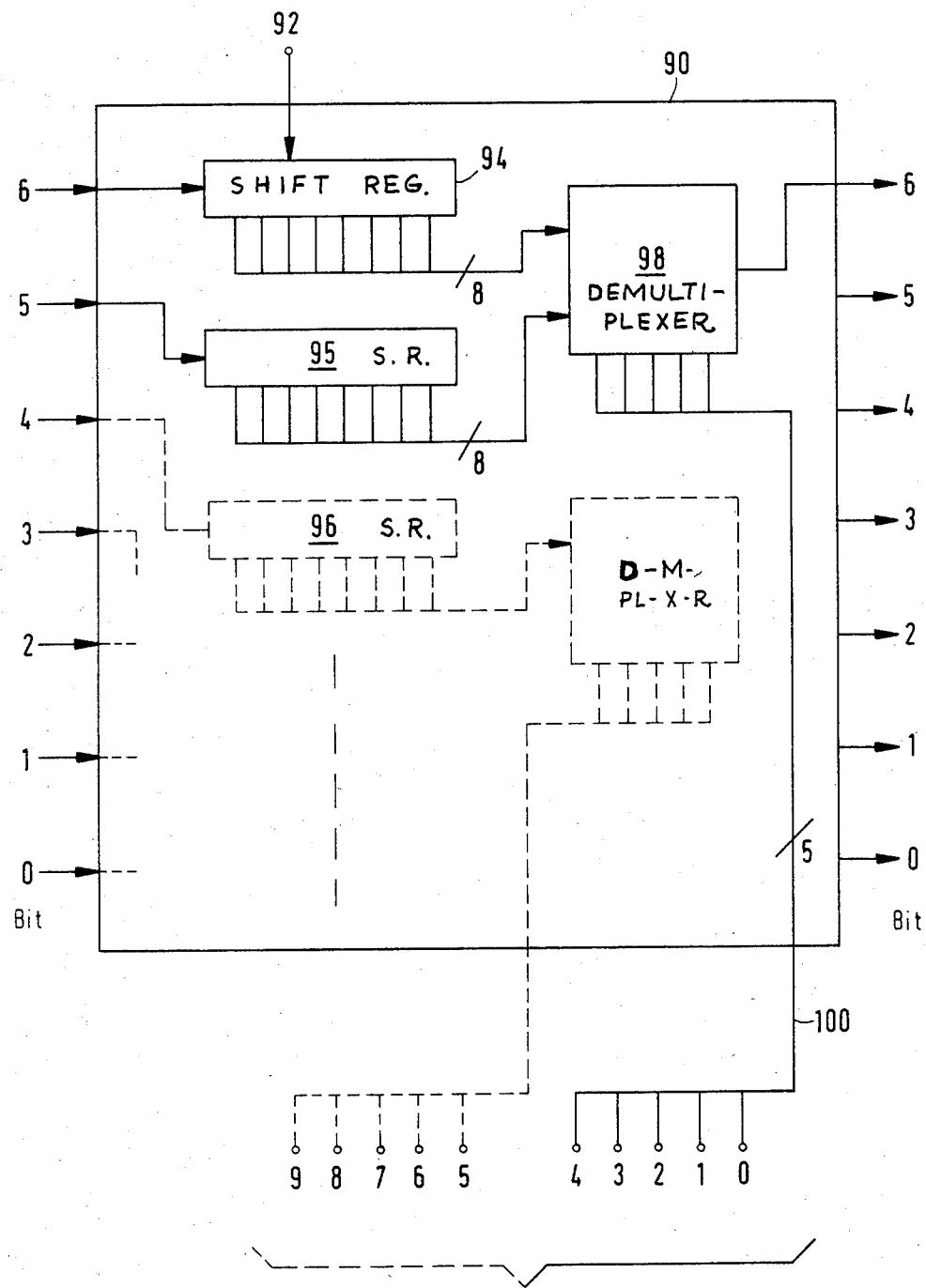
FIG. 8 is a block circuit diagram of a scrambling circuit for the practice of the invention.

The digital unscrambling circuit shown in FIG. 8 has a shift register with serial input and parallel output for each of the seven inputs. In order to simplify the drawing for its ready understanding, only three shift registers 94,95 and 96 are shown in FIG. 8 which may be of the type SN 74164. Clock control is performed in the well-known way from a clock pulse input 92. The 8 parallel output lines of each of two shift registers, in every case, for example the shift registers 94 and 95, are connected to a common demultiplexer, such as the demultiplexer 98 which may for example be a SN 74150 unit. In the present case, accordingly, altogether four demultiplexers are necessary.

The parallel control inputs of the demultiplexers 98 are processed by the control input lines 100 which lead to the demultiplexer 98 from the microprocessor not shown in FIG. 8, in order to scramble the input signals.

For every clock pulse, a delay of about 50 nanoseconds is produced by the shift register 94. In consequence, a maximum of 400 nanoseconds (8×50) can be selected.

Figures 9, 10, 11:
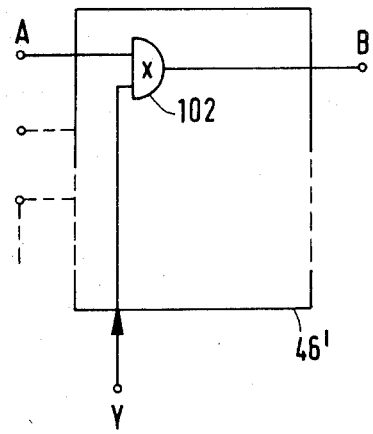
FIG. 9 is a table for explanation of the circuit of FIG. 8.
FIG. 10 is a diagram of a digital sound unscrambling circuit of FIG. 7.
FIG. 11 is a truth table for the circuit of FIG. 10.

In the case of three bits, for example, there are eight possibilities ($2^3$) for selection of eight different delay times as is made clear in the table of FIG. 9. The arrow V1 designates that when the control bits "0 0 0" are applied, a delay of one clock pulse takes place. At the arrow V5, the delay is five clock pulses, and at V8 there is a delay of eight pulses.

With reference to FIGS. 10–13, there will now be explained the operation of the unscrambling circuit 46' which is provided in the circuit block diagram according to FIG. 5 for unscrambling the pulse density modulated sound signal.

FIG. 10 shows a single one of the exclusive-OR gates 102 of the circuit block 46', each of which receives one of the input lines A. The corresponding truth table of the exclusive-OR gate 12 is shown in FIG. 11, which produces the output signals B in a manner dependent upon the control signals Y coming from the microprocessor 70'.

The two pulse diagrams respectively shown in FIGS. 12 and 13 illustrate the manner of operation of the unscrambling circuit 46'. The signal sequence applied to the input A will be periodically modified, as indicated by the two equal time intervals T.

According to the truth table, the input and output signals are identical when a "0" signal is present at the control input Y. In the case of a "1" control signal, the input signal is inverted.

According to this prescription, there results in the first time interval T of FIG. 13 an output signal which corresponds to the inverted input signal, whereas in the following time interval T input and output signals are identical. If now the previous scrambling at the transmitter location is carried out in a corresponding way, an unscrambling of the digital signals can take place in the special illustrated embodiment according to FIG. 5, where it must still be taken account of that the scrambled signal is a pulse density modulator signal.

The inverting of digital signals within defined time intervals is also highly suitable for scrambling and unscrambling the composite video signal. It is also possible to constitute several groups of lines which can then be inverted or left uninverted.

The time intervals T of FIG. 12 can advantageously be derived from the vertical scanning frequency (60 Hz in the U.S.) or from the line scanning frequency.

Digital scrambling and unscrambling and the circuits used therefor make it possible to combine in an advantageous way certain circuit units. Thus, it is practical to combine in one hybrid thick film circuit the logic unscrambling circuits 46 or 46' and 60 or 60' together with the microprocessor 70 or 70'. In that way an increased security against utilization of the signal without the key or against unauthorized unscrambling is provided since the control lines that lead from the microprocessor to the unscrambling circuit are not accessible.

A microprocessor of type 6805 (Motorola) can be used for the microprocessors described in connection with the above-given illustrative examples.

It will be recognized that although the random signal generator 40 may be constituted to produce signals of either random timing or random significance, the key signal produced by the control circuit 42 should not change while the signals relating to a particular picture field are being scrambled, since the key signal provided in a particular vertical blanking interval in the line mixer 36 must serve for unscrambling all the television lines of the following picture field (i.e, until the next vertical blanking interval provides a key signal anew).

Although the invention has been described with reference to particular illustrative examples, it will be recognized that variations and modifications are possible within the inventive concept.

I claim:

1. Method of scrambling and unscrambling both the sound and composite video signals of television transmissions which are transmitted from a transmitting location to a multiplicity of receiving locations through a broadband transmission medium in analog signal form, comprising the steps of:

converting sound and composite video analog signals at said transmission location into first sound and composite video multibit digital signals;

scrambling said first sound digital signals and said first composite video digital signals separately in digital logic circuits by the use of digital key signals respectively corresponding to each of said first multibit digital signals, a set of said key signals being provided to correspond to the said first multibit signals of each television field, to produce first scrambled sound and composite video digital multibit signals, each of said first multibit digital signals being processed in turn in unchanged time sequence both for said sound and composite video signals for scrambling by a corresponding digital key signal of said key signal set, and said set of digital key signals being altered from time to time, but not during the scrambling of signals relating to the same television picture field, in response to the output of a random-signal generator;

converting said first scrambled sound and composite video digital signals into scrambled sound and composite video analog signals;

interleaving in predetermined portions of the successive vertical blanking intervals of said scrambled sound and composite video analog signals the respective sets of digital key signals corresponding to the television picture fields following said blanking intervals;

transmitting said scrambled analog and interleaved signals to said receiving locations through said transmission medium;

separating said interleaved sets of digital key signals from said scrambled analog signals at at least one said receiving location;

converting said scrambled analog signals separately for sound and composite video signals, therein, into second scrambled sound and composite video digital signals at said at least one receiving location;

unscrambling said second scrambled sound and composite video digital signals of successive television fields in logic circuits by reference to the respective separated key signals of said key signal sets successively interleaved in said vertical blanking intervals to produce, after a subsequent digital to analog signal conversion, new sound and composite video analog signals for further television reception stages.

2. Method according to claim 1 in which the same set of said key signals serves both for scrambling said sound digital signals and for scrambling said composite video digital signals of the same television field.

3. Method according to claim 1, in which said predetermined portion of the vertical blanking interval consists of at least one selected television line period within each of said vertical blanking intervals.

4. Method according to claim 2, in which said sets of digital key signals are generated by a control circuit connected to said random-signal generator.

5. Method according to claim 1, in which said unscrambling step is performed by means of a microprocessor connected to said logic circuits and responsive to said separated sets of digital multibit key signals.

6. Method according to claim 1, in which the step of converting said scrambled sound analog signals into digital signals is performed in a manner which produces pulse density modulated signals, and in which the step of unscrambling said second scrambled sound digital signals is performed by reference to modified key signals derived from said separated sets of key signals.

7. Apparatus for scrambling both the sound and composite video signals of television transmissions comprising:
- means for converting sound and composite video analog signals separately into sound and composite video multibit digital signals;
- logic circuit means for scrambling said sound and composite video digital signals of each television field separately in response to a set of multibit digital key signals corresponding to each television field to produce scrambled sound and composite video scrambled digital signals by scrambling both sound and composite video multibit signals signal by signal in bit-parallel fashion with respective multibit key signals of said set in unchanged time sequence both for said sound and for said composite video multibit digital signals;
- means for converting said sound and composite video scrambled digital signals into analog signals to produce sound and composite video scrambled analog signals, and
- means for interleaving said sets of multibit digital key signals in portions of respective vertical blanking intervals of said scrambled composite video analog signals.

8. Apparatus according to claim 7, in which said means for generating said sets of digital multibit key signals includes a random signal generator and means responsive thereto for altering said sets of digital multibit key signals in a random fashion, but only during intervals between picture fields of said composite video digital signals.

9. Apparatus according to claim 7, in which said scrambling means are so constituted as to utilize the same sets of multibit digital key signals for scrambling said sound digital signals and for scrambling said composite video digital signals.

10. Apparatus according to claim 9, in which said means for interleaving said sets of multibit digital key signals are constituted for interleaving each said set of digital key signals in at least one selected television line period of at least one corresponding vertical blanking interval.

11. Apparatus according to claim 7, in which said means for converting analog signals into digital signals has a resolution of at least 12 bits for said composite video signals and a resolution of at least 7 bits for said sound signals.

12. Apparatus for unscrambling television transmissions of sound and composite video scrambled analog signals at a television reception location comprising:
- means for separating sets of multibit digital key signals of said transmissions which are received during portions of respective vertical blanking intervals of said composite video signals;
- A/D conversion means for converting said scrambled analog signals separately into sound and composite video scrambled multibit digital signals;
- logic circuit means for unscrambling said sound and composite video scrambled multibit digital signals of each television field separately with reference to a said set of separated multibit digital key signals to produce sound and composite video unscrambled digital signals, by unscrambling both sound and composite video multibit signals signal by signal in bit-parallel fashion with respective multibit key signals of said set in unchanged time sequence both for said sound and for said composite video multibit digital signals, and
- D/A conversion means for converting said sound and composite video unscrambled digital signals separately into new sound and composite video analog signals.

13. Apparatus according to claim 12, in which a microprocessor is provided, which is responsive to said sets of multibit digital key signals, for controlling said logic circuit means for unscrambling said digital signals of each television field with reference to a corresponding set of said key multibit digital key signals.

14. Apparatus according to claim 13, in which said A/D conversion means for converting analog sound signals are constituted as means for converting said scrambled analog sound signals into pulse density modulated signals, and in which said microprocessor is constituted so as to produce modified control signals for said logic circuit means for unscrambling said sound digital signals, differing from the control signals provided by said microprocessor for unscrambling said scrambled composite video signals in order to take account of the pulse density modulation character of said scrambled sound digital signals.

15. Apparatus according to claim 14, in which said A/D conversion means and said D/A conversion means for converting composite video signals are contained in at least one digital circuit unit provided in said television set for digital processing of at least the composite video signal portion of television transmissions received in unscrambled condition.

16. Apparatus according to claim 12, in which said logic circuit means for unscrambling said composite video scrambled digital signals comprises an array of exclusive-OR gates.

17. Apparatus according to claim 13, in which said logic circuit means comprises shift registers having serial input and parallel output, the parallel outputs of pairs of said shift registers being connected in the case of each said pair to demultiplexers having inputs connected for control by said microprocessor.

18. Apparatus according to claim 12, in which said logic circuit means for unscrambling the scrambled sound digital signals includes an array of exclusive-OR gates respectively corresponding to the quantization steps of said A/D conversion means for converting scrambled analog sound signals into scrambled digital sound signals, said exclusive-OR gates being connected for passing said sound digital signals either unchanged or inverted in alternation in response to timing signals.

19. Apparatus according to claim 18, in which said timing signals are steadily periodic and have a fequency of 60 Hz.

20. Apparatus according to claim 18, in which said timing signals are derived from the television line scanning frequency.

21. Apparatus according to claim 13, in which said logic circuit means and said microprocessor are combined in a hybrid thick-film circuit unit in which the connections between said microprocessor and said logic circuit means are substantially inaccessible and are not decipherable without difficult and complicated analysis.

* * * * *